(No Model.) 6 Sheets—Sheet 1.
J. P. SCOTT.
SEWING MACHINE.
No. 283,669. Patented Aug. 21, 1883.
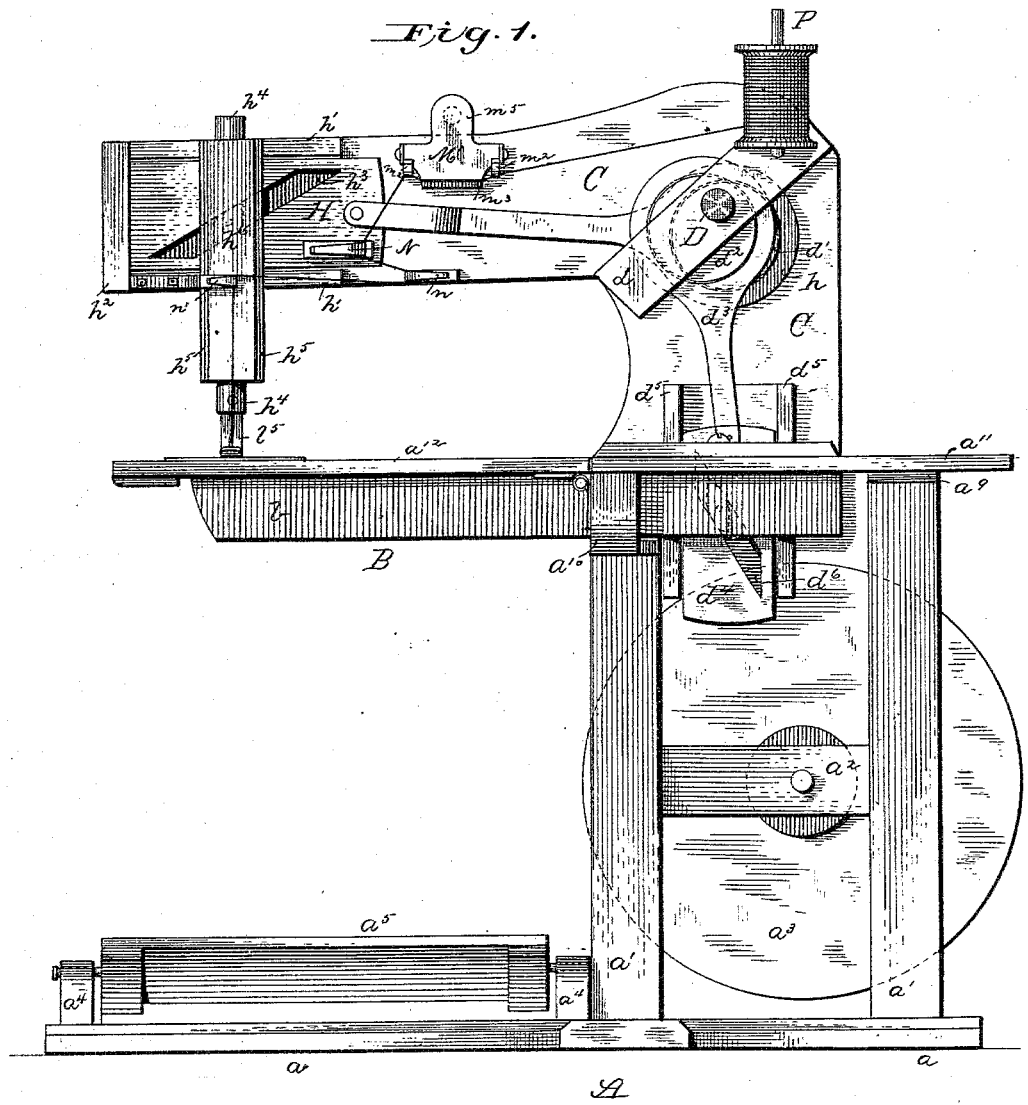
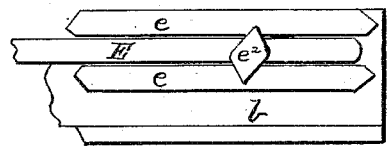

(No Model.)

J. P. SCOTT.
SEWING MACHINE.

No. 283,669. Patented Aug. 21, 1883.

Witnesses:
A. M. Long.
W. J. Osgood.

Inventor
John P. Scott,
by Howard A. Snow
Atty (No Model.)  6 Sheets—Sheet 3.
J. P. SCOTT.
SEWING MACHINE.
No. 283,669.  Patented Aug. 21, 1883.
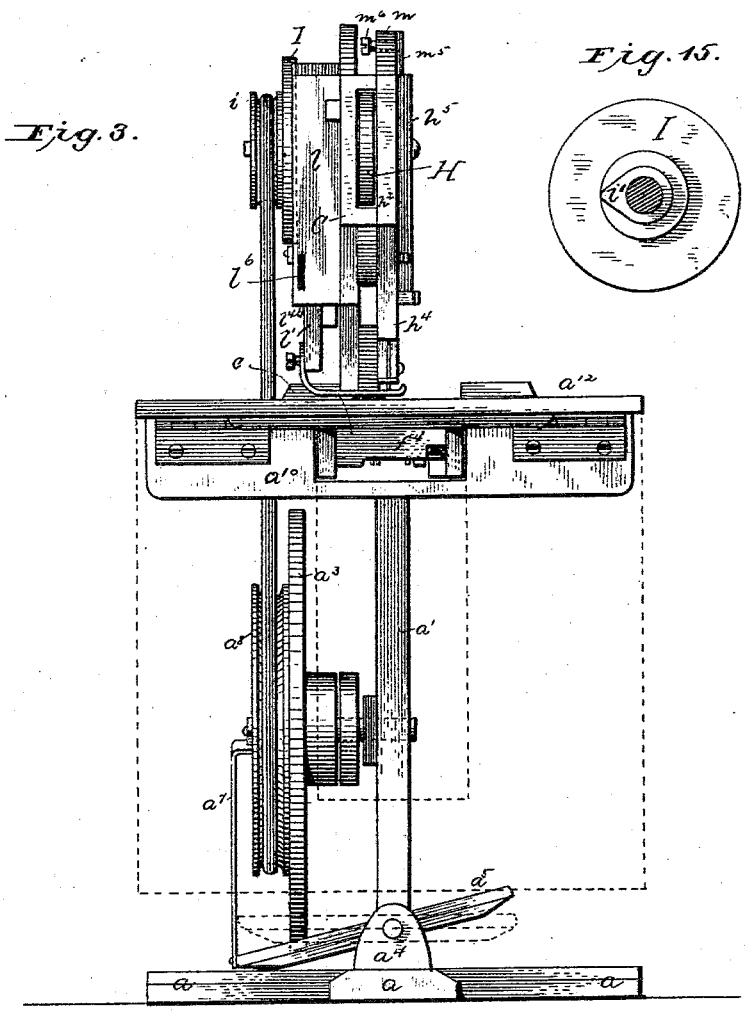
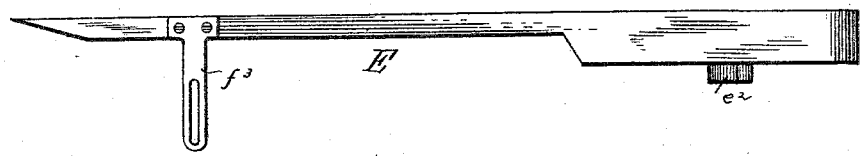
Witnesses:
A. M. Long.
W. J. Osgood
Inventor.
John P. Scott,
per Thomas A. Snow,
Att'y.

(No Model.) 6 Sheets—Sheet 4.
J. P. SCOTT.
SEWING MACHINE.
No. 283,669. Patented Aug. 21, 1883.
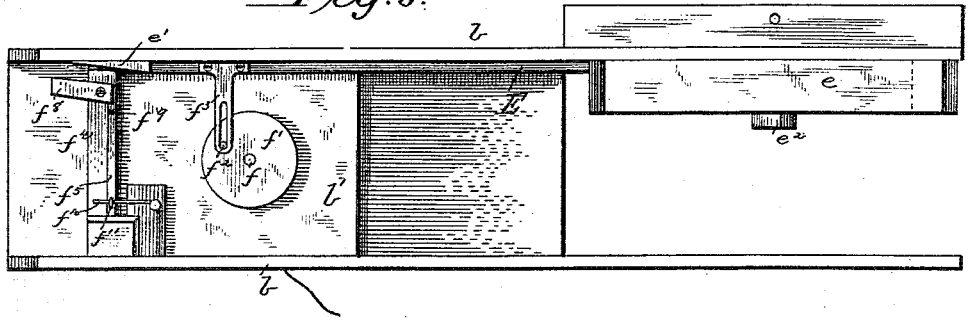
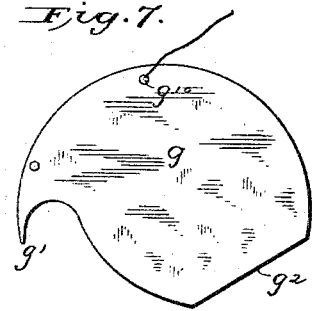
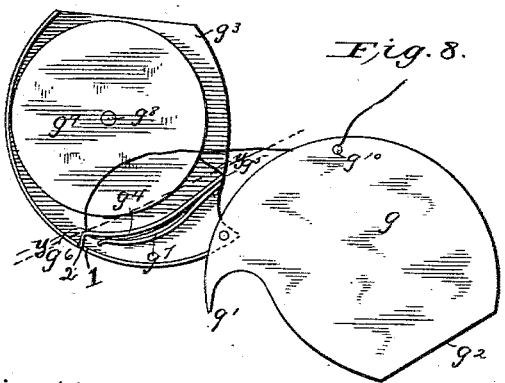
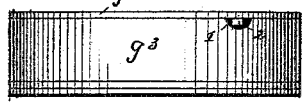
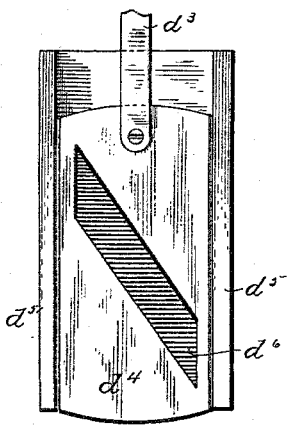
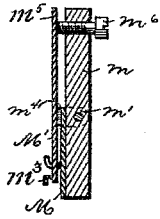
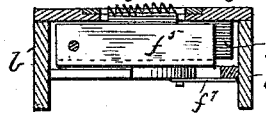
Witnesses:
A. M. Long
W. J. Osgood
Inventor:
John P. Scott,
per Howard A. Snow
Atty.

(No Model.)  6 Sheets—Sheet 5.
J. P. SCOTT.
SEWING MACHINE.
No. 283,669.  Patented Aug. 21, 1883.
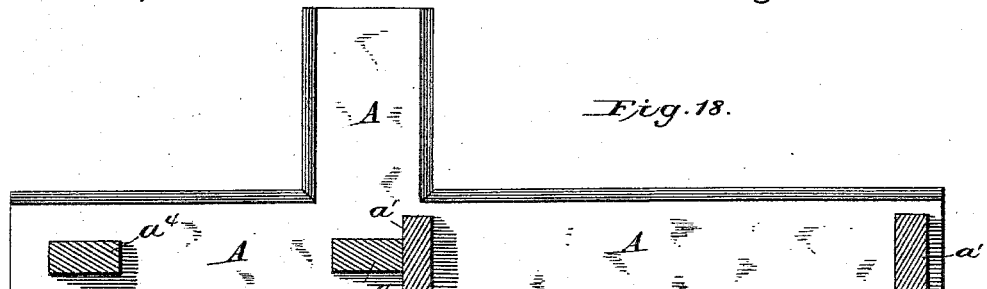
Fig. 18.
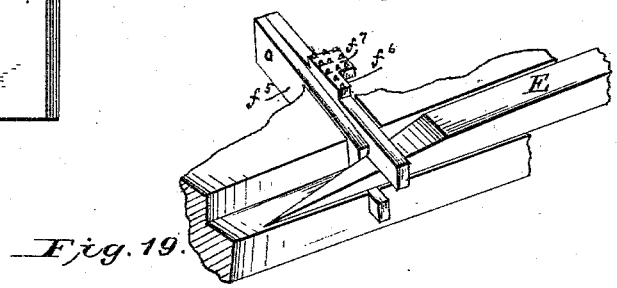
Fig. 29.
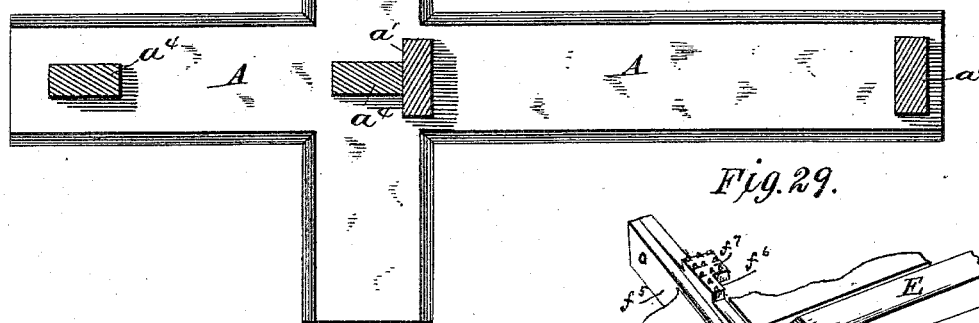
Fig. 19.
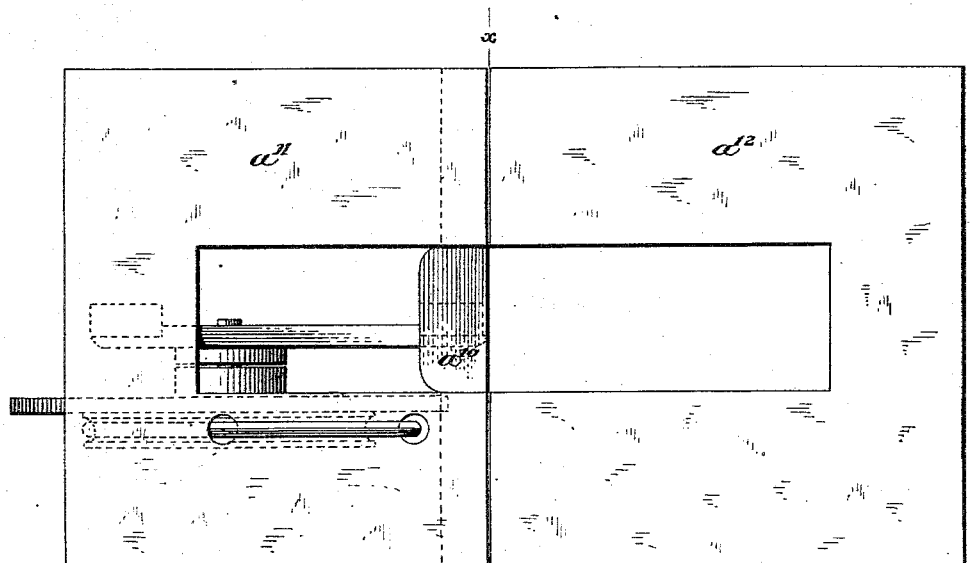
Fig. 20.
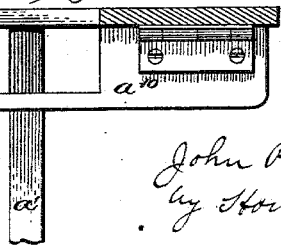
Witnesses:
A. M. Long.
W. J. Osgood.
Inventor.
John P. Scott
by Howard A. Snow
Att'y.

(No Model.)
J. P. SCOTT.
SEWING MACHINE.
No. 283,669. Patented Aug. 21, 1883.
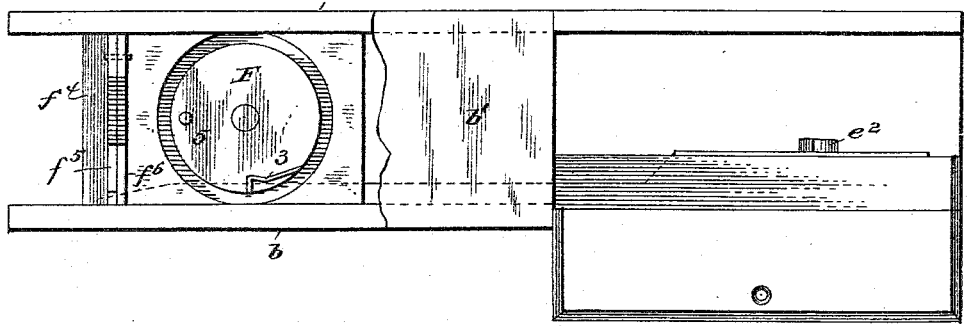
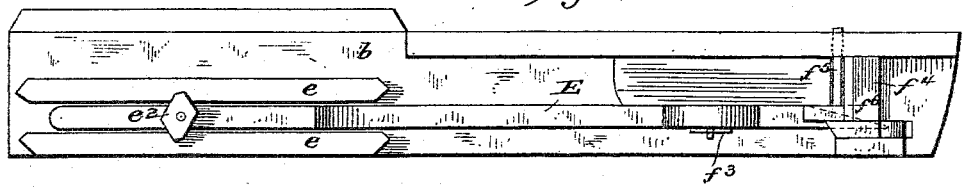
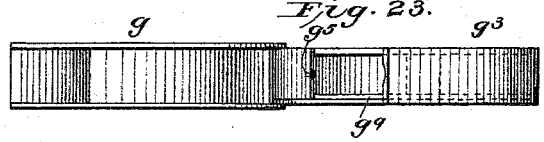
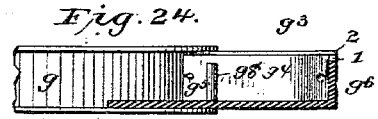
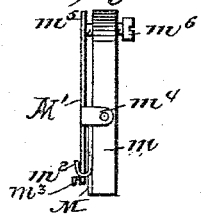
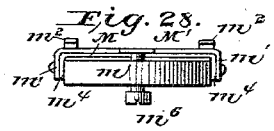
Witnesses
A. M. Long.
W. J. Osgood
Inventor.
John P. Scott
by Howard A. Snow
Atty.

UNITED STATES PATENT OFFICE.

JOHN P. SCOTT, OF DELPHOS, OHIO.

SEWING-MACHINE.

SPECIFICATION forming part of Letters Patent No. 283,669, dated August 21, 1883.

Application filed August 8, 1882. (No model.)

*To all whom it may concern:*

Be it known that I, JOHN P. SCOTT, a citizen of the United States, residing at Delphos, in the county of Allen and State of Ohio, have invented certain new and useful Improvements in Sewing-Machines, of which the following is a specification, reference being had therein to the accompanying drawings.

My invention relates to sewing-machines; and it consists in the construction and arrangement of their several parts, as will be hereinafter fully set forth, and pointed out in the claims.

Figure 2:
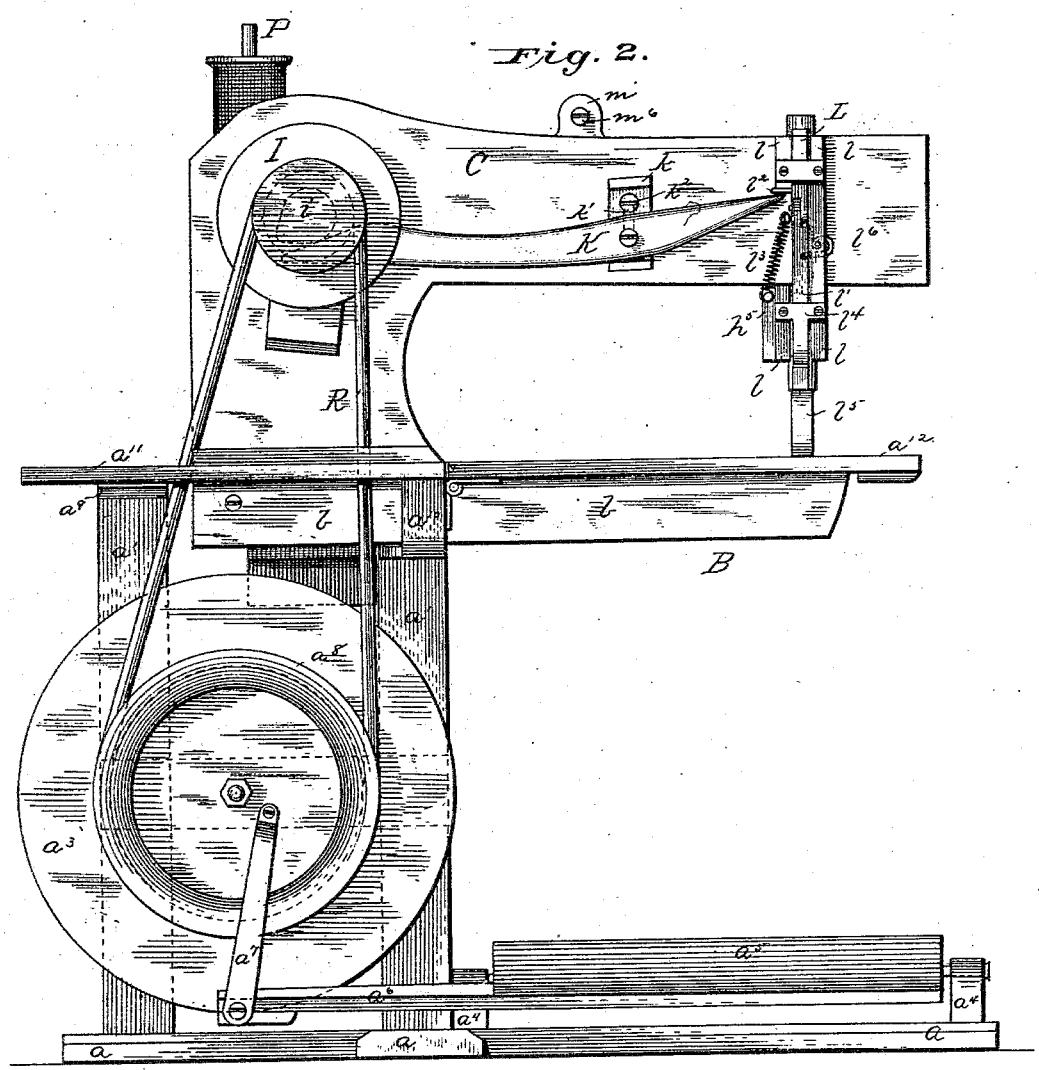
Figure 5:
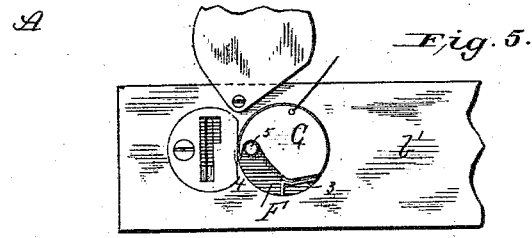

In the drawings, Figure 1 is a front elevation; Fig. 2, a rear elevation; Fig. 3, an elevation from the left-hand end of the machine; Fig. 4, a side elevation of the lift-lever; Fig. 5, a top plan view of the shuttle-arm; Fig. 6, a bottom plan view of the same; Fig. 7, a top plan view of the shuttle closed; Fig. 8, a top plan view of the shuttle opened; Fig. 9, a view of the actuating-slide. Figs. 10 and 11 are details of the feed. Fig. 12 is a vertical cross-section of the tension; Fig. 13, a bottom plan view of the feed and shuttle bar; Fig. 14, a side elevation of the shuttle; Fig. 15, a cross-section on the shaft D, showing the lift-lever cam. Fig. 16 is a vertical cross-section of the arm, showing the arrangement of the feed; Fig. 17, a view of the feed-bar guides. Fig. 18 is a top plan view of the stand; Fig. 19, a top plan view of the table, showing the slot in which the machine-frame rests; Fig. 20, a side elevation, partly in section, showing the slotted sill on which a portion of the frame rests; Fig. 21, a top plan view of the shuttle-arm, showing the position of the feed-plates; Fig. 22, a side elevation of the shuttle-arm, one of the sides removed to show the feed; Fig. 23, a side elevation of the bobbin opened; Fig. 24, a vertical section of the bobbin-frame on the line $y$ $y$, Fig. 8; Fig. 25, a side elevation of the bobbin, and Fig. 26 an elevation of the feed-bar. Fig. 27 is a side elevation of the tension mechanism. Fig. 28 is a top plan view of the same. Fig. 29 is a detail perspective, showing the manner of operating the feed.

A represents the frame or stand upon which the machine is supported. It consists of the cross-shaped base A'. From the intersecting point of the arms rises vertically a support $a'$, and from the end of the long arm rises another support $a'$, as shown. Secured horizontally across these supports is the journal-bar $a^2$, to which is journaled the drive-wheel $a^3$.

Journaled between the lugs $a^4$, secured to the upper side of the long arm of the base A', is the treadle $a^5$, as shown. The treadle is provided with a horizontally-projecting arm, $a^6$, to the end of which is pivoted the pitman $a^7$, its upper end being journaled to the drive-wheel $a^3$. The drive-wheel is provided with a grooved annular projection, $a^8$, which receives the communicating-belt.

Secured at right angles across the upper end of the right-hand support $a'$ is the sill $a^9$, and at right angles across the other support is secured the slotted sill $a^{10}$. To the upper sides of the sills $a^9$ $a^{10}$ is fastened the table $a^{11}$, and hinged to the sill $a^{10}$, on a line with the table $a^{11}$, is the drop-leaf $a^{12}$. The drop-leaf extends around the shuttle-arm and affords suitable rest for the arm of the operator and for the work.

Arranged within a central slot in the table $a^{11}$ and drop-leaf $a^{12}$, resting within the slot of the sill $a^{10}$ and secured to the top of the fixed table $a^{11}$, is the frame upon which is arranged the operating mechanism of the machine. It consists of the shuttle-arm B, the needle-arm C, and their attached mechanism, as will be hereinafter fully set forth.

The shuttle-arm B is formed of the side pieces, $b$, and bed-plate $b'$. The bed-plate extends only to the edge of the fixed table, and the side pieces to within a short distance of the sill $a^9$, as shown.

Secured vertically to the rear arm or side, $b$, is the needle-arm C. It is provided with a projection, $c$, which extends over the said arm and assists in securing it thereto. The needle-arm extends horizontally over the shuttle-arm, and upon it operates the needle mechanism, tension, and device for communicating the motion.

Journaled horizontally through the elbow of the needle-arm is the drive-shaft D, the front end of which is journaled in and supported by the plate $d$, as shown.

Secured around the shaft, between the plate and the needle-arm, is the eccentric $d'$, which communicates motion to the needle mechanism, and the eccentric $d^2$, which communicates motion to the shuttle and feed mechanism.

Placed around the eccentric $d^2$ is the collar $d^3$, the arm of which is pivoted to the upper end of the vertical slide $d^4$, which travels in the grooves $d^5$, situated upon the lower portion of the needle-arm, as shown. The slide $d^4$ is provided with a diagonally-arranged slot, $d^6$. The bar E extends along the side $b$, its right-hand end being supported in the groove $e$, and its left-hand end rests on the block $e'$, as shown.

Near the right-hand end of the bar is a diamond-shaped block, $e^2$, which enters the slot $d^6$ and connects the bar with the slide, so that motion can be readily transmitted from one to the other. The left-hand end of the bar is beveled upon its upper and rear sides, as shown. Formed in the bed-plate of the shuttle-arm, slightly to the right hand of the needle-post, is a circular recess in which operates the shuttle mechanism. Journaled centrally to the floor of this recess, on the pin $f$, is the shuttle-carrier F. The pin $f$ extends through the floor of the recess, and is provided with an actuating-disk, $f'$, provided with a pin, $f^2$, which is embraced by a slotted projection, $f^3$, from the bar E. By means of this mechanism an oscillating motion is transmitted to the shuttle-carrier. The feed mechanism is situated in a recess in the bed-plate immediately to the left hand of the shuttle, the outer wall being formed by the block $f^4$, as shown.

The feed consists of the plates $f^5$ and $f^6$, they being pivoted together at their rear ends, as shown. The plate $f^5$ is shorter than the plate $f^6$, so as to permit the passage between its end and the under side of the plate $f^6$ of the beveled end of the shuttle and feed-bar E. The upper side of the plate $f^6$ is provided with teeth $f^7$, which project through a suitable recess above the bed-plate, take the cloth and carry it along under the needle. Pivoted to the under side of the block $f^4$, by the pivot-pin $p$, is the feed-regulating lever $f^8$, which presses against the pin $f^9$ and regulates the horizontal travel of the feed. A spring, $f^{10}$, is secured to the under side of the bed-plate and presses against the pin $f^{11}$ on the plate $f^5$, so that the feed-plates are returned toward the front of the machine after each stroke of the feed-bar E.

In the operation of the feed the beveled end of the bar E travels across the end of the plate $f^5$ and beneath the plate $f^6$, so that, the two plates being pivoted together, a horizontal motion is given the plate $f^5$ and a vertical motion to the plate $f^6$, which is also given a horizontal motion by the plate $f^5$. The bevel on the upper portion of the bar E is somewhat shorter than that on the side, so that the plate $f^6$ is raised and its teeth projected and made to take the cloth before the bevel on the side of the bar commences to give the plates $f^5$ and $f^6$ their horizontal motion. As the bar is withdrawn or carried to the right by the slide $d^4$ the spring $f^{10}$, pressing against the pin $f^{11}$, forces the plates back toward the front of the machine, ready for the next stroke of the bar E.

G is the shuttle. It consists of a case, $g$, having a hooked projection, $g'$, and straight portion $g^2$, which affords a means of carrying the shuttle around past the needle. The rear side of the shuttle-case is removed to permit the entrance of the bobbin-frame $g^3$, which is pivoted between the upper and lower plates of the case, behind the hook $g'$, as shown. The bobbin-frame is made in the same general shape as the case, and is provided with a side plate, which covers the portion of case-side cut away. Near its pivotal point the frame is provided with a tension-plate, $g^4$, the right-hand end of which has a small notch, $g^5$, Fig. 24, cut in it to permit the passage of the thread. The left-hand end, as shown in Fig. 8, is bent against the side of the frame, and at the point where the plate joins the side a small notch, 1, is cut in its upper edge, as shown in Figs. 8, 14, and 24, into which projects a lip, 2, from the plate $g^4$. From this lip the tension-plate is cut away from the side of the frame to about one-half its width, as shown, and an enlargement, $g^6$, is formed at the bottom, in which travels the thread.

To the rear side of the tension-plate is secured the tension-spring $g^7$, the free end of which presses against the plate with sufficient strength to impart a proper tension to the thread. In the center of the frame is placed a pin, $g^8$, upon which turns the bobbin $g^9$. The bobbin is circular, and consists of two flat disks joined centrally upon a roller, around which is wound the thread. In the operation of the shuttle mechanism the bobbin is placed in the frame $g^3$, upon the pin $g^8$, the thread is carried through the notch $g^5$, between the tension-plate $g^4$ and spring $g^7$, through the notch 1, under the lip 2 into the enlargement, and thence through the hole $g^{10}$ in the case $g'$, when the end of the thread is left free to be taken up by the needle. The frame is then turned into the case, which is placed within the shuttle-recess upon the top of the carrier F, said carrier being provided with a flange, 3, Fig. 5, against which the straight portion of the shuttle-case rests. The left-hand end of this flange is bent L-shaped, and extends to the edge of the carrier, the object being to prevent the slack thread from becoming caught between the shuttle and walls of the recess. The case is placed on the carrier in such position that the hook $g'$ oscillates in front of a recess, 4, into which the needle penetrates. A pin, 5, is placed upon the carrier immediately in front of the hook, and carries it back, after it has been driven past the recess 4, by the flange 3, so that in the operations of the shuttle the pin 5 and flange 3 carry it back and forth past the needle-recess 4, whereby for each downward stroke of the needle, the projection $g'$ catches the thread.

Placed around the eccentric $d'$ is a collar, $h$, the arm of which is pivoted to the horizontal slide H, as shown. The slide moves between raised grooved strips $h'$, which project slightly beyond the face of the slide, as shown.

The slide and grooved strips may be dovetailed, if so desired. A strip, $h^2$, is placed across their left-hand ends, which, with needle-bar grooved strips, holds the slide in place.

The slide is provided with a diagonally-arranged slot, $h^3$, in which slides a diamond-shaped block secured to the needle-bar. The needle-bar $h^4$ slides vertically between strips $h^5$, and is held in place by the face-plate $h^6$. It will be seen that the needle-bar operates at right angles to the slide H, and the travel of the slide back and forward across the bar will operate to impart a vertical reciprocating motion to the bar.

The advantages of the direct connection between the slide and needle bar are simplicity and economy of construction, diminution of friction, and the loss of power involved in the use of intermediate levers, and a movement of equal power and speed in both the upward and downward strokes of the needle-bar.

To the lower end of the needle-bar is secured the needle. Upon the rear end of the drive-shaft is the hand-wheel I, to the outer face of which, or to the end of the shaft, is secured the drive-pulley $i$, as shown. Secured to the drive-shaft, between the hand-wheel and needle-arm, is the cam $i'$, and bearing against the under side of the cam is the lift-lever K, Figs. 2 and 3. This lever is pivoted to the block $k$, which is provided with a vertical slot, $k'$, by means of which the block is secured to the needle-arm by the screw $k^2$, with capability of vertical adjustment. When it is desired to hold the presser-foot stationary, the screw $k^2$ is loosened and the lift-lever allowed to drop to the bottom of the slot $k'$. By this operation the end of the lever which presses under the pin is dropped below it, so that the presser-foot is not elevated in the vertical movements of the lever.

Operating vertically between grooved strips $l\ l$, placed near the left-hand end of the needle-arm, opposite the needle-bar, is the pressure-foot mechanism. It consists of the pressure-bar L, upon the upper end of which is formed a shoulder having pivoted to it the foot-bar $l'$, as shown. Placed on the right-hand side of the shoulder is a pin, $l^2$, against the under side of which presses the end of the lift-lever K, and also secured to the shoulder and to the needle-arm is the spring $l^3$, by means of which a downward pressure is produced upon the pressure-bar.

Secured across the lower portion of the strips $l$ is the T-shaped spring $l^4$, the tongue of which lies in the groove and presses against the foot-bar $l'$, as shown. To the lower end of the foot-bar is secured the foot $l^5$. In the operation of the pressure-foot the spring $l^3$ operates to keep the foot pressed down upon the cloth during the upward stroke of the needle-bar, and the foot-bar, by reason of its being pivoted to the pressure-bar, is moved to the rear against the tension of the spring $l^4$ in the operation of the feed. As the needle in its downward stroke reaches the cloth the cam $i'$ turns against the lift-lever K, depresses its left-hand end, raises its right-hand end, which presses against the pin $l^2$, and raises the foot from the cloth. The spring $l^4$ then forces the foot-bar back to its vertical position, and as soon as the cam passes over the lever the spring $l^3$ again forces it down upon the cloth. The length of the stroke of the pressure-bar is regulated by raising or lowering the pivotal point of the lever by means of the slotted block $k$. The latch $i^6$ is journaled in a suitable slot in the strip $l$, and is adapted to be turned against the outer side of the bar $l'$ and prevent its vibrating motion, as shown.

The tension mechanism consists of the tension-plates M and M', which have bent ears or lugs $m'$ and $m^4$ adapted to embrace the sides of the block $m$, to which they are pivoted by means of screws or other suitable devices. The block $m$, which is in shape, is secured on the same or front side of the goose-neck or needle-arm, as shown in Fig. 1, and to said block is secured depending arms having their ends turned up to form hooks $m^2$, between and below which extend downwardly-projecting lips $m^3$, as shown in Fig. 1. The tension-plate M' is provided with a tongue, $m^5$, against the rear side of which is a regulating-screw, $m^6$, which is adjustably secured to and passes through the block $m$, said screw having the tendency to hold the thread taut or loose, by means of the tension-plates M M', as the screw is turned in either one or the other direction.

Secured upon the slide H and operating with it is the take-up hook N, which acts to draw the thread tight or take up the slack in the upward stroke of the needle. Secured to the needle-arm beneath the tension is the guide-hook $n$, and secured to the face-plate is another guide-hook, $n'$, as shown. In the operation of the tension the thread passes from the spool, which turns on the spindle P, to the tension. It is laid in the right-hand hook $m^2$, is passed between the plates M M', over the left-hand hook $m^2$ to the take-up hook N, back to the guide-hook $n$; thence to the guide-hook $n'$, and from there to the needle.

The tension is regulated by pressing the plates M M' together against the threads by means of the screw $m^6$, and by reason of the plates turning on the same pivotal point the plate M will always remain at the same angle with the plate M', so that the face of the plates will touch each other at all points, and consequently seek and press against the thread at any angle the plates may be turned to by the screw.

It will be seen that the tension is increased or diminished by tightening up the screw $m^6$.

The drive-shaft is connected with the drive-wheel by means of the belt R, which passes around the grooved projection $a^8$ and pulley $i'$, as shown.

Having thus described my invention, what I claim is—

1. The combination, with the drive-shaft D, having suitably-arranged eccentrics, of the slides $d$ and H, said slides being provided with diagonally-arranged slots, by means of which motion is communicated to the sewing-machine, substantially as shown and described.

2. The combination of the drive-shaft and its cam with a lift-lever pivoted to an adjustable block on the needle-arm, the presser-bar, vibrating presser-foot, and spring $l^3$, all arranged to operate substantially as set forth.

3. The combination, with the drive-shaft, slide $d^4$, and bar E, having its end beveled upon two sides, of the shuttle and feed mechanism, both being adapted to be operated by the said bar E, substantially as set forth.

4. The combination, with the drive-shaft, eccentric, the slide $d^4$, having a diagonally-arranged slot, of the bar E, having a block secured near its right-hand end, said block being adapted to travel in the slot $d^6$, whereby the bar is given a horizontal reciprocating motion, said bar being further provided with a slotted projection, $f^3$, adapted to engage the pin $f^2$, situated upon the disk $f'$, and to oscillate the shuttle-carrier F, substantially as set forth.

5. The shuttle-carrier F, secured to the pin $f$, said pin being journaled through the floor of the shuttle-recess, and having upon its lower end the disk $f'$, provided with a pin $f^2$, in combination with the bar E, its slotted projection $f^3$ and its actuating mechanism, as described.

6. The feed consisting of the plates $f^5$ and $f^6$, pivoted together, the plate $f^6$ being longer than the plate $f^5$, both of said plates being arranged to slide in a suitable groove, in combination with the rod E, having its end beveled upon two sides, and adapted to impart a horizontal motion to the plate $f^5$ and a vertical motion to the plate $f^6$, said plate being also adapted to receive a horizontal movement from the plate $f^5$, whereby the teeth $f^7$ of the plate $f^6$ are made to project above the top of the bed-plate and to carry the cloth along for the next stitch, as set forth.

7. The combination, with the drive-shaft, the vertical slide, the feed-plates and feed-bar, of the presser-foot bar, hinged to the presser-foot and adapted to travel with the feed, substantially as set forth.

8. In combination with the shuttle-carrier F, having a flange, 3, and pin 5, situated upon its upper surface, the shuttle G', consisting of the case $g$, having a hook, $g'$, and straight portion $g^2$, adapted to rest against the flange 3, whereby the shuttle is moved forward past the needle, substantially as set forth.

9. The shuttle G, having a hooked projection, $g'$, and straight portion $g^2$, and having a bobbin-frame, $g^3$, hinged between the plates of the case, said bobbin-frame being provided with a tension-plate, $g^4$, having a notch, $g^5$, in one end, and a lip, 2, projecting into a notch, 1, in the frame, whereby the thread is let into a hole, $g^6$, in the said tension-plate, and further provided with a tension-spring, $g^7$, and bobbin $g^9$, all arranged to operate in combination with the needle-bar mechanism, as set forth.

10. The tension consisting of the plates M M', pivoted over each other upon the same pivotal point, the plate M having hooks $m^2$, and the plate M' a tongue, $m^5$, adapted to be pressed upon by the screw $m^6$, whereby the tension upon the thread is regulated, substantially as set forth.

11. The combination of the tension-plates M M' with the slide H, take-up hook N, and guide-hooks $n$ $n'$, substantially as set forth.

In testimony whereof I affix my signature in presence of two witnesses.

JOHN P. SCOTT.

Witnesses:
W. J. OSGOOD,
P. PRINTZ.